(12) United States Patent
Yamasaki et al.

(10) Patent No.: US 9,536,637 B2
(45) Date of Patent: Jan. 3, 2017

(54) MULTILAYERED HEAT-RECOVERABLE ARTICLE, WIRE SPLICE, AND WIRE HARNESS

(71) Applicants: Sumitomo Electric Industries, Ltd., Osaka-shi, Osaka (JP); Sumitomo Electric Fine Polymer, Inc., Sennan-gun, Osaka (JP)

(72) Inventors: Satoshi Yamasaki, Osaka (JP); Shinya Nishikawa, Osaka (JP); Ryouhei Fujita, Sennan-gun (JP); Yasutaka Emoto, Sennan-gun (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 117 days.

(21) Appl. No.: 14/394,843

(22) PCT Filed: Sep. 18, 2013

(86) PCT No.: PCT/JP2013/075164
§ 371 (c)(1),
(2) Date: Oct. 16, 2014

(87) PCT Pub. No.: WO2014/097695
PCT Pub. Date: Jun. 26, 2014

(65) Prior Publication Data
US 2015/0068800 A1    Mar. 12, 2015

(30) Foreign Application Priority Data

Dec. 20, 2012 (JP) ................................ 2012-278700

(51) Int. Cl.
*H02G 15/08* (2006.01)
*H02G 3/04* (2006.01)
(Continued)

(52) U.S. Cl.
CPC .................. *H01B 3/448* (2013.01); *B32B 1/08* (2013.01); *B32B 7/12* (2013.01); *B32B 27/08* (2013.01);
(Continued)

(58) Field of Classification Search
CPC .. B32B 1/08; B32B 2250/02; B32B 2307/542; B32B 2307/736; H02G 15/1806; H02G 3/0481
(Continued)

(56) References Cited

U.S. PATENT DOCUMENTS 3,847,694 A    11/1974    Stewing
3,920,268 A    11/1975    Stewing
(Continued)

FOREIGN PATENT DOCUMENTS

CN    1255937 A    6/2000
CN    1789362 A    6/2006
(Continued)

OTHER PUBLICATIONS

Machine transation of JP 2011 148876 A as attached to Office Action dated Jan. 29, 2016 in U.S. Appl. No. 14/365,644.
(Continued)

*Primary Examiner* — William H Mayo, III
*Assistant Examiner* — Rhadames J Alonzo Miller
(74) *Attorney, Agent, or Firm* — Drinker Biddle & Reath LLP

(57) ABSTRACT

A multilayered heat-recoverable article 1 includes a base material layer 10 and an adhesive layer 11 disposed on the inner side of the base material layer 10. The adhesive layer
(Continued)

11 includes [A] a thermoplastic resin having a melt flow rate of 15 g/10 min to 1,000 g/10 min at 190° C. and a load of 2.16 kg, [B] an organically treated layered silicate, and [C] a deterioration inhibitor. The shear viscosity at 150° C. of the adhesive layer 11 is 300 Pa·s or more at a shear rate of 0.1 $s^{-1}$ and 200 Pa·s or less at a shear rate of $100 s^{-1}$.

11 Claims, 3 Drawing Sheets

(51) Int. Cl.
*B32B 7/12* (2006.01)
*H01B 3/44* (2006.01)
*H02G 15/18* (2006.01)
*B32B 27/18* (2006.01)
*H01B 7/00* (2006.01)
*H01B 3/30* (2006.01)
*B32B 27/08* (2006.01)
*B32B 27/22* (2006.01)
*B32B 27/30* (2006.01)
*B32B 27/32* (2006.01)
*B32B 27/34* (2006.01)
*B32B 27/36* (2006.01)
*B32B 1/08* (2006.01)

(52) U.S. Cl.
CPC ............... *B32B 27/18* (2013.01); *B32B 27/22* (2013.01); *B32B 27/304* (2013.01); *B32B 27/32* (2013.01); *B32B 27/34* (2013.01); *B32B 27/36* (2013.01); *H01B 3/305* (2013.01); *H01B 3/441* (2013.01); *H01B 7/0045* (2013.01); *H02G 15/1806* (2013.01); *B32B 2250/02* (2013.01); *B32B 2307/206* (2013.01); *B32B 2307/51* (2013.01); *B32B 2307/542* (2013.01); *B32B 2307/736* (2013.01); *B32B 2457/00* (2013.01); *H02G 3/0481* (2013.01); *Y10T 428/2852* (2015.01)

(58) Field of Classification Search
USPC ........................ 174/72 A, 72 R; 428/355 R
See application file for complete search history.

(56) References Cited

U.S. PATENT DOCUMENTS

| | | | |
|---|---|---|---|
| 3,983,070 A | 9/1976 | Penneck | |
| 4,383,131 A * | 5/1983 | Clabburn | H02G 15/10 156/49 |
| 4,472,468 A | 9/1984 | Tailor et al. | |
| 4,707,388 A | 11/1987 | Park et al. | |
| 4,731,273 A | 3/1988 | Bonk et al. | |
| 4,751,121 A * | 6/1988 | Kuhnel | B32B 27/32 428/214 |
| 4,751,269 A | 6/1988 | Bonk et al. | |
| 4,965,320 A | 10/1990 | Overbergh | |
| 5,091,478 A | 2/1992 | Saltman | |
| 5,346,539 A | 9/1994 | Hosoi et al. | |
| 5,411,777 A | 5/1995 | Steele et al. | |
| 5,470,622 A | 11/1995 | Rinde et al. | |
| 5,747,560 A | 5/1998 | Christiani et al. | |
| 5,767,448 A | 6/1998 | Dong | |
| 5,914,160 A * | 6/1999 | Matsufuji | B29C 61/0616 138/118 |
| 6,146,726 A * | 11/2000 | Yoshii | B32B 27/08 428/34.9 |
| 6,342,282 B1 * | 1/2002 | Yoshii | B32B 27/08 428/34.9 |
| 6,548,587 B1 | 4/2003 | Bagrodia et al. | |
| 2003/0026926 A1 * | 2/2003 | Muto | B29C 61/003 428/34.9 |
| 2004/0176522 A1 | 9/2004 | Schaetzle et al. | |
| 2006/0254799 A1 * | 11/2006 | Gregorek | H01R 4/70 174/74 A |
| 2007/0015875 A1 * | 1/2007 | Globus | C08J 9/0061 525/199 |
| 2007/0149734 A1 * | 6/2007 | Sakakibara | C08F 14/18 526/247 |
| 2010/0170611 A1 | 7/2010 | Hammond et al. | |
| 2011/0065867 A1 * | 3/2011 | Keung | C08J 5/18 525/240 |
| 2011/0272173 A1 * | 11/2011 | Shiotsuki | C08F 8/22 174/110 SR |
| 2015/0004408 A1 | 1/2015 | Yamasaki et al. | |
| 2015/0333494 A1 | 11/2015 | Yamasaki et al. | |

FOREIGN PATENT DOCUMENTS

| | | |
|---|---|---|
| CN | 101547970 A | 9/2009 |
| CN | 102408617 A | 4/2012 |
| EP | 1 398 344 A1 | 3/2004 |
| JP | S54-84294 A | 7/1979 |
| JP | S54-161111 A | 12/1979 |
| JP | S61-218320 A | 9/1986 |
| JP | S61-278585 A | 12/1986 |
| JP | H03-207780 A | 9/1991 |
| JP | 5-214305 A | 6/1993 |
| JP | H05-162203 A | 6/1993 |
| JP | H08-230037 A | 9/1996 |
| JP | H09-45380 A | 2/1997 |
| JP | H11-512469 A | 10/1999 |
| JP | 2000-129042 A | 5/2000 |
| JP | 2000-506955 A | 6/2000 |
| JP | 2001-514287 A | 9/2001 |
| JP | 4019524 B2 | 12/2007 |
| JP | 2008-533285 A | 8/2008 |
| JP | 2008-251261 A | 10/2008 |
| JP | 2009-501840 A | 1/2009 |
| JP | 2009-507958 A | 2/2009 |
| JP | 2010-539252 A | 12/2010 |
| JP | 2011-100708 A | 5/2011 |
| JP | 2011-148876 A | 8/2011 |
| JP | 2011148876 A * | 8/2011 |
| WO | WO 99/35206 A1 | 7/1999 |
| WO | WO-2005/052015 A1 | 6/2005 |

OTHER PUBLICATIONS

U.S. Office Action dated Jan. 29, 2016 that issued in U.S. Appl. No. 14/365,644 including Double Patenting Rejections on pp. 10-15.

* cited by examiner

MULTILAYERED HEAT-RECOVERABLE ARTICLE, WIRE SPLICE, AND WIRE HARNESS

TECHNICAL FIELD

The present invention relates to a multilayered heat-recoverable article in which an adhesive layer is disposed on the inner side of a base material layer, a wire splice, and a wire harness.

BACKGROUND ART

Heat-recoverable articles, such as heat-shrinkable tubes and heat-shrinkable caps, are used as covering for joints between insulated wires, wire terminals, and metal pipes for the purpose of waterproofing, corrosion protection, and the like. For example, when a joint between insulated wires is covered with a heat-shrinkable tube and heating is performed, the heat-shrinkable tube shrinks along the shape of the joint and adheres thereto, and thus the joint can be protected.

Examples of such heat-recoverable articles include a multilayered heat-recoverable article in which an adhesive layer is provided on the inner surface of a heat-shrinkable base material layer (refer to Japanese Unexamined Patent Application Publication No. 2000-129042). As the adhesive layer, a hot-melt adhesive, such as an ethylene-vinyl acetate copolymer (EVA), an ethylene-ethyl acrylate copolymer (EEA), or a polyamide resin, is used. Furthermore, the adhesive layer may be formed so as to include two thermoplastic resin layers (refer to Japanese Unexamined Patent Application Publication No. 8-230037 and Japanese Patent No. 4019524).

On the other hand, a multilayered heat-recoverable article is produced by a method in which a heat-shrinkable base material layer and an adhesive layer are each extruded into a tubular shape, then the resulting tubular body is expanded in the radial direction (the diameter is expanded) under heating, and cooling is performed to fix the shape. In some cases, in order to improve heat resistance, the extruded multilayered heat-recoverable article may be irradiated with ionizing radiation so that the heat-shrinkable base material layer can be crosslinked.

When the multilayered heat-recoverable article is used, by performing heating with an adherend being covered with the multilayered heat-recoverable article, heat shrinkage of the heat-shrinkable base material layer occurs, and at the same time, the adhesive layer is fluidized. At this time, the space between the adherend and the heat-shrinkable base material layer is filled with the fluidized adhesive layer, and thereby, the multilayered heat-recoverable article is made to adhere closely to the adherend.

In the case where the multilayered heat-recoverable article is made to adhere to an insulated wire, which is an example of the adherend, in which a conductor is covered with an insulating resin layer, the adhesive layer of the multilayered heat-recoverable article comes into contact with the insulating resin layer. When the insulating resin layer and the adhesive layer are in contact with each other, depending on the types of resin and additive used in the insulating resin layer and the adhesive layer, there is a possibility that the insulating resin layer of the insulated wire will be deteriorated. Consequently, in order to avoid deterioration of the insulating resin layer, it is necessary to appropriately select the combination of the insulating resin layer and the adhesive layer, and the type of adherend for which the multilayered heat-recoverable article can be used becomes restricted. As a result, the user has to select a multilayered heat-recoverable article that is unlikely to be deteriorated according to the type of adherend, such as an insulated wire, which is inconvenient.

CITATION LIST

Patent Literature

PTL 1: Japanese Unexamined Patent Application Publication No. 2000-129042
PTL 2: Japanese Unexamined Patent Application Publication No. 8-230037
PTL 3: Japanese Patent No. 4019524

SUMMARY OF INVENTION

Technical Problem

The present invention has been achieved under these circumstances, and it is an object of the invention to provide a multilayered heat-recoverable article in which adverse effects, such as deterioration, do not affect an adherend, such as an insulated wire, and diversification of the type of usable adherend and extension of the life of the adherend can be promoted; and a wire splice and a wire harness each including the multilayered heat-recoverable article.

Solution to Problem

In an aspect of the present invention which has been achieved in order to solve the problem described above, a multilayered heat-recoverable article includes a base material layer and an adhesive layer disposed on an inner side of the base material layer, characterized in that the adhesive layer includes [A] a thermoplastic resin having a melt flow rate of 15 g/10 min to 1,000 g/10 min at 190° C. and a load of 2.16 kg, [B] an organically treated layered silicate, and [C] a deterioration inhibitor; and the shear viscosity at 150° C. of the adhesive layer is 300 Pa·s or more at a shear rate of $0.1\ s^{-1}$ and 200 Pa·s or less at a shear rate of $100\ s^{-1}$.

In the multilayered heat-recoverable article, since the adhesive layer includes the deterioration inhibitor [C], when the multilayered heat-recoverable article is made to adhere to an adherend, such as an insulated wire, deterioration of the adherend can be inhibited. As a result, adverse effects, such as deterioration, do not affect the adherend, and diversification of the type of usable adherend and extension of the life of the adherend can be promoted.

The content of the deterioration inhibitor [C] is preferably 25% to 300% by mass relative to the organically treated layered silicate [B]. By setting the content of the deterioration inhibitor [C] in the range described above, it is possible to suppress deterioration of the adherend due to the organically treated layered silicate.

Preferably, the deterioration inhibitor [C] is at least one selected from the group consisting of activated clay, hydrotalcite, and a phosphorus-containing antioxidant having an acid value of 10 mgKOH/g or more. By using such a deterioration inhibitor, deterioration of the adherend due to the organically treated layered silicate can be further suppressed.

The content of the organically treated layered silicate [B] is preferably 1 to 15 parts by mass relative to 100 parts by mass of the thermoplastic resin [A]. By setting the content of the organically treated layered silicate [B] in the range described above, the shear viscosity of the adhesive layer can be properly adjusted. As a result, extrudability is improved when the adhesive layer is formed, and embeddability (adhesion) is improved when the multilayered heat-recoverable article is made to adhere to the adherend.

The storage elastic modulus at 110° C. of the adhesive layer is preferably 0.1 MPa or less. By setting the storage elastic modulus in the range described above, the adhesive layer is easily deformed during shrinkage of the base material layer. As a result, embeddability (adhesion) is improved when the multilayered heat-recoverable article is made to adhere to the adherend.

In the case where the multilayered heat-recoverable article is used to cover an insulated wire (hereinafter, also referred to as the "PVC wire") which includes a conductor and a polyvinyl chloride layer provided on the outer periphery thereof, preferably, cracks do not occur in the polyvinyl chloride layer under heating conditions at 150° C. and for 200 hours. When cracks do not occur in the polyvinyl chloride layer under such heating conditions, deterioration of the insulated wire or the like, which is an adherend, can be further suppressed. As a result, diversification of the type of usable adherend and extension of the life of the adherend can be further promoted.

Preferably, the thermoplastic resin [A] is at least one of an ethylene-vinyl acetate copolymer and a polyamide. By using such a thermoplastic resin [A] for the adhesive layer, good dispersibility of the organically treated layered silicate [B] in the thermoplastic resin [A] can be obtained. As a result, extrudability is improved when the adhesive layer is formed, and embeddability (adhesion) is improved when the multilayered heat-recoverable article is made to adhere to the adherend.

Preferably, the base material layer includes at least one selected from the group consisting of a polyethylene, a polyester, a polyamide, and a fluororesin. Since these resins are available inexpensively, the production costs can be reduced.

In another aspect of the present invention which has been achieved in order to solve the problem described above, a wire splice includes a plurality of wires, each including a conductor and an insulating layer provided on the outside thereof, and the multilayered heat-recoverable article made to adhere to a joint in which the conductors of the plurality of wires are connected to each other.

The wire splice includes the multilayered heat-recoverable article. Therefore, since the multilayered heat-recoverable article is suppressed from causing adverse effects, such as deterioration, on the adherend, extension of the life of the adherend can be promoted.

Preferably, the insulating layer includes, as a main component, polyvinyl chloride. Although such an insulating layer including, as a main component, polyvinyl chloride is likely to be deteriorated, even in the wire including such an insulating layer, extension of life can be promoted by the multilayered heat-recoverable article. As a result, extension of the life of the wire splice can be promoted.

In another aspect of the present invention which has been achieved in order to solve the problem described above, a wire harness includes a plurality of wires, each including a conductor and an insulating layer provided on the outside thereof, and the multilayered heat-recoverable article made to adhere to the plurality of wires.

The wire harness includes the multilayered heat-recoverable article. Therefore, since the multilayered heat-recoverable article is suppressed from causing adverse effects, such as deterioration, on the adherend, extension of the life of the adherend can be promoted.

Preferably, the insulating layer includes, as a main component, polyvinyl chloride. Although such an insulating layer including, as a main component, polyvinyl chloride is likely to be deteriorated, even in the wire including such an insulating layer, extension of life can be promoted by the multilayered heat-recoverable article. As a result, extension of the life of the wire harness can be promoted.

Herein, the melt flow rate (MFR) is the value measured, using an extrusion plastometer stipulated in JIS K6760, under the conditions at a temperature of 190° C. and a load of 2.16 kg in accordance to JIS K7210.

The shear viscosity is the value measured at 150° C. using a rotational rheometer.

The storage elastic modulus is the value of the storage elastic modulus at a strain of 0.1% when measurement is performed using a rotational rheometer in oscillatory mode with strain being varied from 0.001% to 10%.

The expression "cracks do not occur in the polyvinyl chloride layer" means that, in the wire harness in which the multilayered heat-recoverable article is made to adhere to the PVC wire, when visually confirmed after heating at 150° C. for 200 hours, cracks do not occur in the polyvinyl chloride layer to such an extent that the conductor is visible.

Advantageous Effects of Invention

In the multilayered heat-recoverable article, and the wire splice and the wire harness, each including the multilayered heat-recoverable article, according to the present invention, as described above, adverse effects, such as deterioration of the insulated wire or the like, which is an adherend, can be suppressed, and as a result, diversification of the type of usable adherend and extension of the life of the adherend can be promoted.

DESCRIPTION OF EMBODIMENTS

Figure 1:
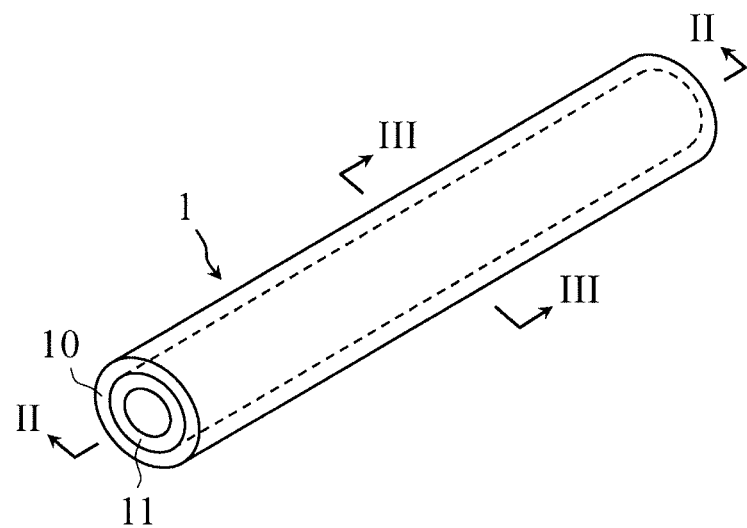
FIG. 1 is an overall perspective view showing an embodiment of a multilayered heat-recoverable article according to the present invention.
Figure 2:
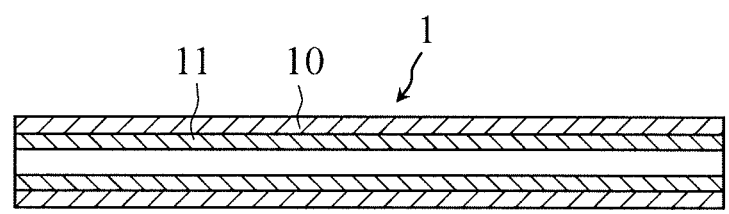
FIG. 2 is a cross-sectional view taken along the line II-II of FIG. 1.
Figure 3:
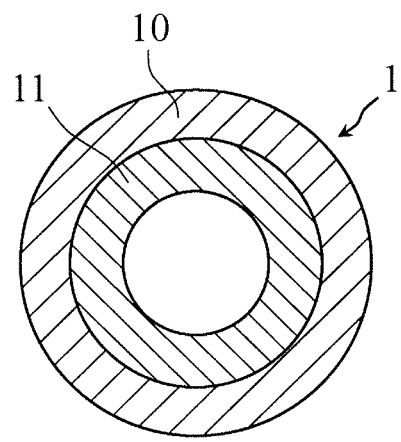
FIG. 3 is a cross-sectional view taken along the line III-III of FIG. 1.

A multilayered heat-recoverable article 1 shown in FIGS. 1 to 3 is used to cover a joint between insulated wires, a wire terminal, or a metal pipe for the purpose of waterproofing, corrosion protection, or the like. The multilayered heat-recoverable article 1 includes a base material layer 10 and an adhesive layer 11 disposed on the inner side of the base material layer 10. The multilayered heat-recoverable article 1 is cut to an appropriate length. The size may be selected according to intended use, and a long multilayered heat-recoverable article may be formed.

The adhesive layer 11 enhances adhesion of the base material layer 10 to an adherend portion and improves waterproofness or the like. The adhesive layer 11 is composed of an adhesive composition including [A] a thermoplastic resin, [B] an organically treated layered silicate, and [C] a deterioration inhibitor.

<[A] Thermoplastic Resin>The thermoplastic resin [A] has a melt flow rate (MFR) of 15 g/10 min to 1,000 g/10 min. The MFR is an index showing the flowability of a resin. When the MFR exceeds 1,000 g/10 min, the flowability is excessively high, which makes it difficult to stably extrude the adhesive layer 11. When the MFR is less than 15 g/10 min, it is not possible to sufficiently secure the flowability during heat shrinkage of the base material layer 10 when the multilayered heat-recoverable article 1 is used. Therefore, by using the thermoplastic resin [A] having an MFR of 15 g/10 min to 1,000 g/10 min, it is possible to obtain an adhesive composition (adhesive layer 11) having good flowability. Consequently, the extrudability of the adhesive composition is improved, and the adhesion of the multilayered heat-recoverable article 1 to the adherend is improved. More preferably, the thermoplastic resin [A] having an MFR of 100 g/10 min to 800 g/10 min is used.

Preferably, the thermoplastic resin [A] is at least one selected from the group consisting of an ethylene-vinyl acetate copolymer and a polyamide. By using such a thermoplastic resin [A] for the adhesive layer, good dispersibility of the organically treated layered silicate [B] in the thermoplastic resin [A] can be obtained. As a result, extrudability is improved when the adhesive layer 11 is formed, and embeddability (adhesion) is improved when the multilayered heat-recoverable article 1 is made to adhere to an insulated wire or the like. An ethylene-vinyl acetate copolymer and a polyamide may be used alone or in combination. More preferably, an ethylene-vinyl acetate copolymer is used alone or in combination with a polyamide.

The content of vinyl acetate in the ethylene-vinyl acetate copolymer is preferably 12% to 46% by mass. When the content of vinyl acetate is 12% by mass or more, dispersion of the organically treated layered silicate [B] in the thermoplastic resin [A] is facilitated. On the other hand, when the content of vinyl acetate exceeds 46% by mass, sticking of the adhesive composition to a die, a mold, or the like occurs, and handling becomes difficult.

<[B] Organically Treated Layered Silicate>

The organically treated layered silicate [B] mainly has a function of improving the viscosity characteristics of the adhesive composition. The organically treated layered silicate [B] is a substance obtained by organically treating a layered silicate (clay mineral, or clay). Examples of the layered silicate include montmorillonite, bentonite, and smectite. Furthermore, either a natural material or a synthetic material can be used. As the organic compound used for the organic treatment of the layered silicate, for example, a quaternary ammonium salt may be used. Examples of the quaternary ammonium salt include dimethyl distearyl ammonium chloride and benzyl dimethyl stearyl ammonium chloride.

In the organically treated layered silicate [B], interlayer cations, such as magnesium ions, sodium ions, or calcium ions, are intercalated between adjacent planar silicate layers, and a layered crystal structure is maintained. The interlayer cations are ion-exchanged with organic cations by organic treatment. By introducing organic cations between adjacent planar silicate layers, the interlayer distance increases in the silicate. As a result, layer separation occurs in the silicate, and the separated layers are detached, resulting in an increase in the surface area. Accordingly, in the organically treated layered silicate [B], dispersibility in the thermoplastic resin [A] is improved compared with a layered silicate that is not organically treated, which can contribute to improvement of extrudability.

The specific surface of the organically treated layered silicate [B] is preferably 3 to 50 $m^2/g$. By incorporating such an organically treated layered silicate [B], excellent workability can be achieved during mixing with the thermoplastic resin [A].

Elemental analysis allows confirming that the adhesive composition contains the organically treated layered silicate [B]. Since the organically treated layered silicate contains silicon (Si) and aluminum (Al), by confirming the presence of Si and Al by subjecting the adhesive layer 11 to elemental analysis, the presence of the organically treated layered silicate [B] can be confirmed.

<[C] Deterioration Inhibitor>

The deterioration inhibitor [C] inhibits deterioration of an adherend to which the multilayered heat-recoverable article 1 is made to adhere. Typically, the deterioration inhibitor [C] inhibits occurrence of cracks in the insulating layer due to basic components, such as nitrogen-containing compounds, contained in the covering layer of the insulated wire or the adhesive layer 11 of the multilayered heat-recoverable article 1. The deterioration inhibitor [C] can also have a function of modifying the viscosity characteristics of the adhesive composition. The deterioration inhibitor [C] may be selected depending on the factors that cause deterioration of the adherend. For example, a deterioration inhibitor that can inhibit deterioration of the adherend due to basic components is used. As the deterioration inhibitor [C], for example, a compound that inhibits dehydrochlorination reaction due to basic components, or a compound capable of capturing or neutralizing hydrogen chloride, chloride ions, or the like generated by hydrochloric acid reaction can be used.

The deterioration inhibitor [C] is preferably at least one selected from the group consisting of activated clay, hydrotalcite, and a phosphorus-containing antioxidant (with an acid value of 10 mgKOH/g or more). By incorporating such a deterioration inhibitor [C], it is possible to suppress adverse effects, such as deterioration, on the adherend, such as an insulated wire. Activated clay is obtained by subjecting acid clay to heat and acid treatment such that the specific surface is increased, and has a property of adsorbing a nitrogen-containing compound. Hydrotalcite is a carbonate mineral having a layered structure and has a property of intercalating anions between adjacent layers. A phosphorus-containing antioxidant (with an acid value of 10 mgKOH/g or more) can capture hydrogen chloride generated by dehydrochlorination reaction.

Preferable examples of the deterioration inhibitor [C] are "GALLEON EARTH V2", which is activated clay, and "MIZUKA ACE" (manufactured by Mizusawa Industrial Chemicals, Ltd.), "DHT-4A" (manufactured by Kyowa Chemical Industry Co., Ltd.), which is hydrotalcite, and an acid phosphate, which is a phosphorus-containing antioxidant (with an acid value of 10 mgKOH/g or more).

Examples of the acid phosphate include ethyl acid phosphate, oleyl acid phosphate, butyl acid phosphate, dibutyl pyrophosphate, butoxyethyl acid phosphate, 2-ethylhexyl acid phosphate, alkyl(C12, C14, C16, C18)acid phosphate, isotridecyl acid phosphate, tetracosyl acid phosphate, ethylene glycol acid phosphate, 2-hydroxyethyl methacrylate acid phosphate, dibutyl phosphate, and bis(2-ethylhexyl) phosphate. Among these acid phosphates, ethyl acid phosphate and oleyl acid phosphate are more preferable.

<Adhesive Composition>

The contents of the organically treated layered silicate [B] and the deterioration inhibitor [C] in the adhesive composition are selected such that the shear viscosity at 150° C. is 300 Pa·s or more at a shear rate of 0.1 $s^{-1}$ and 200 Pa·s or less at a shear rate of 100 $s^{-1}$.

The content of the organically treated layered silicate [B] is preferably 1 to 15 parts by mass relative to 100 parts by mass of the thermoplastic resin [A]. When the content of the organically treated layered silicate [B] is less than 1 part by mass, the effect of modifying viscosity characteristics cannot be obtained sufficiently. On the other hand, when the content of the organically treated layered silicate [B] exceeds 15 parts by mass, the effect of improving extrudability can be obtained. However, when the amount of the organically treated layered silicate [B] added increases, there is a concern that deterioration of the adherend (insulating layer of a PVC wire or the like), which is caused by the organic compound, such as a quaternary ammonium salt, used in the organic treatment of layered silicate, may be promoted, or there is a possibility that because of a decrease in flowability in the adhesive layer 11 during melting, sufficient adhesion to the adherend (sufficient waterproofness or the like by adhesion of the multilayered heat-recoverable article 1) will not be secured.

The content of the deterioration inhibitor [C] is preferably 25% to 300% by mass relative to the organically treated layered silicate [B]. When the content of the deterioration inhibitor [C] is less than 25% by mass, the effect of inhibiting deterioration of the organically treated layered silicate [B] cannot be obtained sufficiently. Therefore, there is a possibility that deterioration of the adherend, such as a PVC wire, will not be suppressed sufficiently. On the other hand, when the content of the deterioration inhibitor [C] exceeds 300% by mass, the dispersibility of the organically treated layered silicate [B] in the thermoplastic resin [A] is decreased. Therefore, it is not possible to sufficiently obtain the characteristics anticipated by incorporating the organically treated layered silicate [B] in the adhesive composition, such as extrudability of the adhesive composition during molding, and flowability of the adhesion layer 11 at the time of adhesion of the multilayered heat-recoverable article 1. As a result, there is a possibility that sufficient waterproofness cannot be provided for the adherend when the multilayered heat-recoverable article 1 is made to adhere to the adherend. The content of the deterioration inhibitor [C] is more preferably 50% to 300% by mass relative to the organically treated layered silicate [B].

The viscosity of the adhesive composition is adjusted by dispersing the organically treated layered silicate [B] and the deterioration inhibitor [C] in the thermoplastic resin [A]. The shear viscosity at 150° C. of the adhesive composition is set to be 300 Pa·s or more at a shear rate of 0.1 $s^{-1}$ and 200 Pa·s or less at a shear rate of 100 $s^{-1}$.

By setting the shear viscosity of the adhesive composition to be 300 Pa·s or more at a shear rate of 0.1 $s^{-1}$, the flow of the adhesive composition during extrusion of the adhesive layer 11 can be suppressed, and the variation in the thickness of the adhesive layer 11 can be suppressed. That is, when the adhesive composition passes through a die during extrusion, a high shear stress is applied to the adhesive composition, and the flowability is increased. On the other hand, after the adhesive composition has passed through the die, the shear stress applied to the adhesive composition decreases. Accordingly, when the viscosity of the adhesive composition is low, the adhesive layer 11 formed after passing through the die is deformed, and a variation in the thickness occurs. In some cases, the hollow portion inside the adhesive layer 11 may be filled with the adhesive composition. In contrast, when the shear viscosity of the adhesive composition is set to be 300 Pa·s or more at a shear rate of 0.1 $s^{-1}$, the viscosity can be maintained such that the flow of the adhesive composition can be suppressed immediately after passing through the die. Thus, a variation in the thickness of the adhesive layer 11 formed after passing through the die can be suppressed.

An adhesive composition having a shear viscosity of about 300 Pa·s at 150° C. and at a shear rate of 0.1 $s^{-1}$ has relatively high flowability. However, even in the case of the adhesive composition having a shear viscosity of about 300 Pa·s at a shear rate of 0.1 $s^{-1}$, by contriving a die shape, deformation of the adhesive layer 11 formed after passing through the die can be suppressed, and extrusion of the adhesive layer 11 can be performed without any problem.

On the other hand, when the shear viscosity of the adhesive composition is set to be 200 Pa·s or less at a shear rate of 100 $s^{-1}$, a decrease in the flowability of the adhesive layer 11 can be suppressed during heating for causing heat shrinkage of the base material layer 10 when the multilayered heat-recoverable article 1 is made to adhere to the adherend. Accordingly, the adhesive layer 11 is sufficiently brought into contact with the adherend at the time of heat shrinkage of the base material layer 10, and thus good adhesion between the base material layer 10 and the adherend can be achieved.

The storage elastic modulus at 110° C. of the adhesive composition is preferably 0.1 MPa or less. When the storage elastic modulus of the adhesive composition (adhesive layer 11) is more than 0.1 MPa, even when stress is applied, the shape is maintained. Therefore, embeddability (adhesion) of the adhesive layer 11 during shrinkage of the base material layer 10 is degraded. In contrast, when the storage elastic modulus of the adhesive composition (adhesive layer 11) is 0.1 MPa or less, the adhesive layer 11 is easily deformed during shrinkage of the base material layer 10. Therefore, embeddability (adhesion) of the adhesive layer 11 during shrinkage of the base material layer 10 can be improved.

Additives other than the thermoplastic resin [A], the organically treated layered silicate [B], and the deterioration inhibitor [C] may be added to the adhesive composition. Examples of the additives include a coloring agent, a lubricant, a heat stabilizer, and an ultraviolet absorber. The adhesive composition can be produced by mixing the thermoplastic resin [A], the organically treated layered silicate [B], the deterioration inhibitor [C], and as necessary, additives other than these using a mixer, such as an open roll mixer, a pressure kneader, a single screw mixer, or a twin screw mixer.

<Base Material Layer>

The base material layer 10 is formed as a tube which reduces in diameter when heated. The resin composition constituting the base material layer 10 includes at least one selected from the group consisting of a polyethylene, a polyester, a polyamide, and a fluororesin, and as necessary, additives are mixed therein. Examples of the additives include a flame retardant, an antioxidant, a coloring agent, a lubricant, a heat stabilizer, and an ultraviolet absorber.

<Method for Producing Multilayered Heat-Recoverable Article>

In the production process of the multilayered heat-recoverable article 1, first, a resin composition for the base material layer 10 and an adhesive composition for the adhesive layer 11 are extruded using a melt extruder to obtain a multilayered extruded article. The resulting multilayered extruded article is heated to a temperature equal to or higher than the melting point, and in that state, the multilayered extruded article is expanded to a predetermined external shape by a method of introducing compressed air thereinto, or the like, and cooled to fix the shape. Thereby, the multilayered heat-recoverable article 1 is obtained. In the multilayered extruded article which has been extruded, the component of the base material layer 10 may be crosslinked to improve heat resistance. Crosslinking can be performed, for example, by a method of crosslinking using irradiation with ionizing radiation, chemical crosslinking, thermal crosslinking, or the like.

The size of the multilayered heat-recoverable article 1 can be designed according to intended use or the like. Regarding the size of the base material layer 10 of the multilayered heat-recoverable article 1, before expansion, for example, the inside diameter is 1.0 to 30 mm, and the thickness is 0.1 to 10 mm. Regarding the size of the adhesive layer 11 of the multilayered heat-recoverable article 1, before expansion, for example, the thickness is 0.1 to 10 mm, and the inside diameter is 0.1 to 8.5 mm. In the multilayered heat-recoverable article 1, the adhesive composition used for the adhesive layer 11 has excellent extrudability. Therefore, even in the case where the inside diameter of the adhesive layer 11 is decreased to 1.0 mm or less, extrusion can be performed satisfactorily. The sizes of the base material layer 10 and the adhesive layer 11 are only examples and do not restrict the multilayered heat-recoverable article of the present invention.

In the multilayered heat-recoverable article 1, since the adhesive layer 11 (adhesive composition) includes the deterioration inhibitor [C], when the multilayered heat-recoverable article 1 is made to adhere to an adherend, deterioration of the adherend can be inhibited. For example, in the case where a multilayered heat-recoverable article is made to adhere to a PVC insulated wire insulated by a polyvinyl chloride (PVC) layer, which is an adherend, there is a concern that dehydrochlorination reaction due to basic components contained in the polyvinyl chloride layer may take place, and the polyvinylchloride layer may be deteriorated by hydrogen chloride or chloride ions, which are reaction products. Furthermore, in one example, the organically treated layered silicate [B] for modifying viscosity characteristics is treated with a quaternary ammonium salt. Accordingly, when the organically treated layered silicate [B] treated with an organic compound, such as a quaternary ammonium salt, is included in the adhesive layer (adhesive composition), there is a concern that deterioration of the polyvinyl chloride layer may be promoted by the organic compound.

In such a case, by incorporating the deterioration inhibitor [C] in the adhesive layer 11 (adhesive composition), deterioration of the polyvinyl chloride layer due to basic components can be inhibited. More specifically, in the case where activated clay is used as the deterioration inhibitor [C], the activated clay adsorbs basic nitrides, and thus, dehydrochlorination reaction can be inhibited. In the case where hydrotalcite or a phosphorus-containing antioxidant (with an acid value of 10 mgKOH/g or more) is used as the deterioration inhibitor [C], such a compound can capture or neutralize reaction products (hydrogen chloride and chloride ions) in dehydrochlorination reaction. By inhibiting dehydrochlorination reaction due to basic components or capturing or neutralizing reaction products in dehydrochlorination reaction in such a manner, deterioration of the polyvinyl chloride layer in the PVC insulated wire can be suppressed. As will be evident from examples, which will be described later, in the multilayered heat-recoverable article 1, in the state in which the multilayered heat-recoverable article 1 is made to adhere to a PVC wire, even under the severe conditions of heating at 150° C. for 200 hours, cracks do not occur in the polyvinyl chloride layer to such an extent that the conductor wire can be visually confirmed.

Similarly, in an insulated wire or cable other than the PVC insulated wire, by selecting the deterioration inhibitor [C] to be used, deterioration of an insulating layer or protective layer can be suppressed. As a result, it is possible to expand the range of use of the multilayered heat-recoverable article 1 to adherends which have been avoided for use. Accordingly, the range of types of adherend to which the multilayered heat-recoverable article 1 is applicable can be expanded, and therefore, it is possible to relieve user's inconvenience in that a heat-recoverable article must be selected according to the type of adherend, such as insulated wire.

Figure 4:
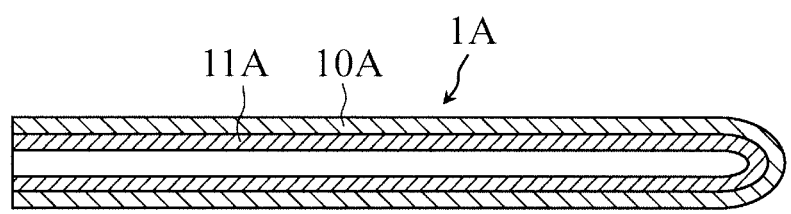
FIG. 4 is a cross-sectional view, which corresponds to FIG. 2, showing another embodiment of a multilayered heat-recoverable article according to the present invention.

In addition to the multilayered heat-recoverable article 1 shown in FIGS. 1 to 3 in which the base material layer 10 is formed in a tubular shape, the multilayered heat-recoverable article of the present invention may be a multilayered heat-recoverable article 1A shown in FIG. 4 in which a base material layer 10A is formed in a cap shape. In the multilayered heat-recoverable article 1A, one end of the multilayered heat-recoverable article 1 is subjected to heat shrinkage and closed, and thereby, an adhesive layer 11A is disposed inside the cap-shaped base material layer 10A. The multilayered heat-recoverable article 1A can be used, for example, for wire terminal treatment.

<Wire Splice and Wire Harness>

The multilayered heat-recoverable article 1 or 1A of the present invention can be used for protection, waterproofing, or the like of a PE wire covered with an insulating layer composed of polyethylene (PE), or a wire (e.g. electric wire or cable) provided with an insulating layer composed of another thermoplastic resin, such as PVC. Specifically, the multilayered heat-recoverable article 1 or 1A can be used for a wire splice and a wire harness.

Figure 5:
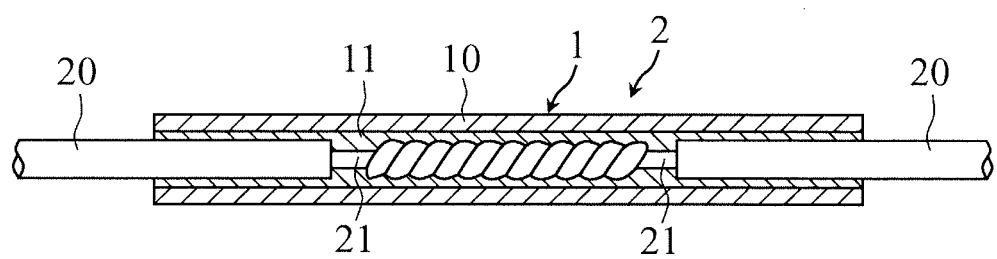
FIG. 5 is a cross-sectional view, which corresponds to FIG. 2, showing an embodiment of a wire splice according to the present invention.
Figure 6:
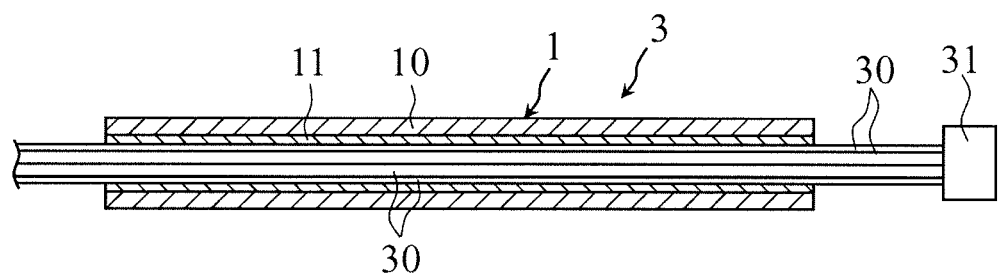
FIG. 6 is a cross-sectional view, which corresponds to FIG. 2, showing an embodiment of a wire harness according to the present invention.
Figure 7:
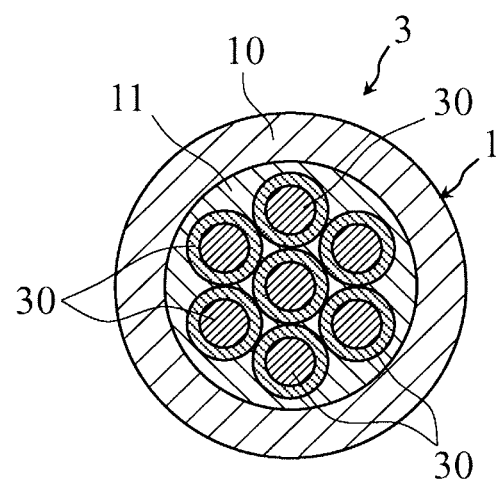
FIG. 7 is a cross-sectional view, which corresponds to FIG. 3, of the wire harness shown in FIG. 6.

FIG. 5 shows an example in which the multilayered heat-recoverable article 1 is used in a wire splice 2, and FIGS. 6 and 7 show an example in which the multilayered heat-recoverable article 1 is used in a wire harness 3.

In the wire splice 2 shown in FIG. 5, conductor wires 21 of a pair of wires 20 are connected to each other and the multilayered heat-recoverable article 1 is made to adhere to the joint thereof. The wire 20 is an insulated wire or cable, such as a PE wire or PVC wire. In the wire 20, for example, the insulating layer located as an outermost layer contains, as a main component, polyvinyl chloride. Here, the term "main component" refers to a component whose content is highest among the components constituting the insulating layer. The content of polyvinyl chloride in the insulating layer is, for example, 50% to 95% by mass. In such a wire splice 2, the multilayered heat-recoverable article 1 can contribute to protection and waterproofing of the joint.

In the wire harness 3 shown in FIGS. 6 and 7, a plurality of wires 30 are tied together by the multilayered heat-recoverable article 1, and a multi-pin connector 31 is provided on the ends of the plurality of wires 30. The wire 30 is the same as the wire 20 of the wire splice 2 shown in FIG. 5. In the wire harness 3, the multilayered heat-recoverable article 1 not only has a function of tying the wires 30 together, but also has a function of protecting the individual wires 30 and providing waterproofness.

Note that, in some cases, the wire splice and the wire harness according to the present invention may not be strictly distinguished from each other. A wire splice may also serve as a wire harness in some cases.

The multilayered heat-recoverable article, the wire splice, and the wire harness of the present invention are not limited to the embodiments described above.

For example, the multilayered heat-recoverable article may be formed by separately extruding the base material layer and the adhesive layer. In such a case, the adhesive layer is set inside the base material layer which has been expanded after extrusion. The resulting multilayered heat-recoverable article is used by being made to adhere to an adherend, and shrinking the base material layer.

The multilayered heat-recoverable article of the present invention may be formed in a sheet shape, in addition to in a tube shape and in a cap shape. In a sheet-shaped multilayered heat-recoverable article, an adhesive layer is disposed on one surface of a base material layer. For example, the sheet-shaped multilayered heat-recoverable article is used, in the state in which it is wrapped around an adherend, by subjecting the base material layer to heat shrinkage. That is, in the sheet-shaped multilayered heat-recoverable article, in the state in which the base material layer is wrapped around the adherend, the adhesive layer is disposed on the inner side of the base material layer.

In the wire splice of the present invention, as long as the multilayered heat-recoverable article is made to adhere to a joint between wires, a wire may be connected to a plurality of wires, a plurality of wires may be connected to a plurality of wires, or ends of a plurality of wires may be connected collectively as in wire terminal treatment. Other configurations may also be used.

The wire harness of the present invention may be configured as a so-called flat harness in which a plurality of wires are tied together in a planar shape. Other configurations may also be used.

EXAMPLES

The present invention will be described more in detail on the basis of examples. However, it is to be understood that the examples do not limit the scope of the present invention.

Examples 1 to 16 and Comparative Examples 1 to 10

<Production of Two-Layered Extruded Article/Evaluation of Workability>

(Production of Two-Layered Extruded Article)

A two-layered extruded article is a non-expanded, non-crosslinked intermediate product before a multilayered heat-recoverable article is produced. The two-layered extruded article was produced by simultaneously extruding an adhesive layer composed of an adhesive composition and a base material layer composed of a polyethylene with a melting point of 125° C.

Each adhesive composition was prepared by melt-mixing the thermoplastic resin [A] with necessary components of the organically treated layered silicate [B], the viscosity characteristics modifier [D], and the deterioration inhibitor [C] with the compositional ratio shown in Table I or II. The compounds used for preparation of the adhesive compositions are shown in Table III.

The base material layer was formed with a target outside diameter of 4.6 mm, a target inside diameter of 2.8 mm, and a target thickness of 0.9 mm. The adhesive layer was formed with a target outside diameter of 2.8 mm, a target inside diameter of 0.6 mm, and a target thickness of 1.1 mm.

(Evaluation of Workability (Extrudability Test))

In a multilayered heat-recoverable article, when there is a large variation in the thickness of the adhesive layer, the inside may be filled with the adhesive composition and closed, which prevents air from passing therethrough. Accordingly, an extrudability test was carried out, in which air was blown from one end of a multilayered extruded article, which had been cut into an appropriate length, and it was confirmed whether or not air came out through the opposite end. In the extrudability test, the case where air coming out through the opposite end was confirmed was evaluated to be "A", and the case where air coming out through the opposite end was not confirmed was evaluated to be "C".

<Evaluation of Multilayered Heat-Recoverable Article>

(Production of Multilayered Heat-Recoverable Article)

A multilayered heat-recoverable article was produced by a method in which the previously fabricated two-layered extruded article was irradiated with ionizing radiation to crosslink the base material layer, then expanded such that the outside diameter of the base material layer was 7.5 mm, and cooled to fix the shape.

(PVC Wire Deterioration Test)

In a PVC wire deterioration test, an evaluation was made using a wire harness including a multilayered heat-recoverable article.

A wire harness was produced by a method in which four PVC wires were passed through a multilayered heat-recoverable article, the resulting workpiece was placed horizontally on the floor of a thermostat oven at 150° C., and heating was performed for 120 seconds to shrink the base material layer.

Each of the PVC wires was obtained by covering a conductor wire with a polyvinyl chloride layer, followed by crosslinking by irradiation and had an outside diameter of 1.5 mm. The polyvinyl chloride layer included 100 parts by mass of PVC, 50 parts by mass of a trimellitate serving as a plasticizer, and 10 parts by mass of a lubricant and a stabilizer.

In the deterioration test, the resulting wire harness was placed horizontally on the floor of a thermostat oven at 150° C., and heating was performed for 200 hours. Then, it was visually confirmed whether or not cracks occurred in the polyvinyl chloride layer.

Regarding multilayered heat-recoverable articles poorly extruded (in which the adhesive layer was clogged (Comparative Examples 1, 3, and 7 to 9)), ends of two PVC wires were bonded to each other to form one wire using the adhesive layer (adhesive composition) separated from the multilayered heat-recoverable article, and an evaluation was made using the resulting wire.

In the PVC wire deterioration test, the case where cracks did not occur in the polyvinyl chloride layer of the PVC wire was evaluated to be "A", the case where although cracks occurred, the conductor wire was not visible was evaluated to be "B", and the case where cracks occurred and the conductor wire was visible was evaluated to be "C".

(Waterproofness Test)

In a waterproofness test, an evaluation was made using a wire splice including a multilayered heat-recoverable article.

A wire splice was produced by a method in which a conductor wire of an insulated wire and a conductor wire of each of four insulated wires were welded together, the welded portion was covered with a multilayered heat-recoverable article, the resulting workpiece was placed horizontally on the floor of a thermostat oven at 180° C., and heating was performed for 90 seconds to shrink the base material layer. In the wire splice thus produced, one insulated wire extends from one end of the multilayered heat-recoverable article, and four insulated wires extend from the other end.

In the waterproofness test, the resulting wire splice was placed in water, air at 200 kPa was blown for 30 seconds into one end of the multilayered heat-recoverable article from which one insulated wire extended, it was confirmed whether or not bubbles were generated from the other end from which four insulated wires extended.

In the waterproofness test, the case where bubbles were not generated was evaluated to be "A", and the case where bubbles were generated was evaluated to be "C".

<Evaluation of Adhesive Layer (Adhesive Composition)>

In the examples, a series of evaluations shown below were conducted on the adhesive layer (adhesive composition) obtained by separating the base material layer from the multilayered heat-recoverable article.

(Measurement of Shear Viscosity)

The shear viscosity was measured at 150° C. using a rotational rheometer ("MCR302" manufactured by Anton Paar Japan K.K). The shear viscosity was measured at each of a shear rate of $0.1\ s^{-1}$ (shear viscosity 1) and a shear rate of $100\ s^{-1}$ (shear viscosity 2).

(Measurement of Storage Elastic Modulus)

The storage elastic modulus was measured as an elastic modulus at a strain of 0.1% when measurement was performed using the rotational rheometer in oscillatory mode with strain being varied from 0.001% to 10%.

(Element Detection)

Element detection was performed by energy-dispersive X-ray spectroscopy for the purpose of detecting Si, Ca, Al, and P.

Note that, in Table II, the expression "-" indicates that the test was not conducted in the item of the waterproofness test, and indicates that target elements were not detected in the item of the element detection.

TABLE I

| | | | Example | | | | | | | |
|---|---|---|---|---|---|---|---|---|---|---|
| | | | 1 | 2 | 3 | 4 | 5 | 6 | 7 | 8 |
| Composition (parts by mass) | [A] Thermoplastic resin | EVA1 | 100 | 50 | | 100 | 100 | 100 | 100 | 100 |
| | | EVA2 | | 50 | | | | | | |
| | | EVA3 | | | 100 | | | | | |
| | | EVA4 | | | | | | | | |
| | | Polyamide | | | | | | | | |
| | [B] Organically treated layered silicate | Organically treated layered silicate 1 | 3 | 3 | 3 | 1 | 1 | 15 | 15 | |
| | | Organically treated layered silicate 2 | | | | | | | | 3 |
| | [D] Viscosity characteristics modifier | Layered silicate | | | | | | | | |
| | | Calcium carbonate | | | | | | | | |
| | | Talc | | | | | | | | |
| | | Zeolite | | | | | | | | |
| | [C] Deterioration inhibitor | Activated clay 1 | 3 | 3 | 3 | 0.5 | 3 | 15 | 45 | 3 |
| | | Activated clay 2 | | | | | | | | |
| | | Phosphorus-based antioxidant 1 | | | | | | | | |
| | | Phosphorus-based antioxidant 2 | | | | | | | | |
| | | Hydrotalcite | | | | | | | | |
| Evaluation | Two-layered extruded article | Extrudability test | A | A | A | A | A | A | A | A |
| | Multilayered heat-recoverable article | PVC wire deterioration test | A | A | A | A | A | A | A | A |
| | | Waterproofness test | A | A | A | A | A | A | A | A |
| | Adhesive layer (Adhesive composition) | Shear viscosity 1 | 1240 | 1150 | 1180 | 470 | 340 | 5330 | 4260 | 1180 |
| | | Shear viscosity 2 | 150 | 120 | 160 | 150 | 160 | 150 | 190 | 150 |
| | | Storage elastic modulus | 0.018 | 0.015 | 0.017 | 0.011 | 0.011 | 0.039 | 0.036 | 0.014 |
| | | Element detection | Si, Al | Si, Al | Si, Al | Si, Al | Si, Al | Si, Al | Si, Al | Si, Al |

| | | | Example | | | | | | |
|---|---|---|---|---|---|---|---|---|---|
| | | | 9 | 10 | 11 | 12 | 13 | 14 | 15 | 16 |
| Composition (parts by mass) | [A] Thermoplastic resin | EVA1 | 100 | 100 | 100 | 100 | 100 | 100 | | 100 |
| | | EVA2 | | | | | | | | |
| | | EVA3 | | | | | | | | |
| | | EVA4 | | | | | | | | |
| | | Polyamide | | | | | | | 100 | |
| | [B] Organically treated layered silicate | Organically treated layered silicate 1 | 3 | 3 | 1 | 3 | 3 | 3 | 3 | 1 |
| | | Organically treated layered silicate 2 | | | | | | | | |

TABLE I-continued

|  |  |  | | | | | | | | |
|---|---|---|---|---|---|---|---|---|---|---|
| | [D] Viscosity characteristics modifier | Layered silicate | | | | | | | | |
| | | Calcium carbonate | | | | | | | | |
| | | Talc | | | | | | | | |
| | | Zeolite | | | | | | | | |
| | [C] Deterioration inhibitor | Activated clay 1 | | | | | | | 2 | 3 | 0.2 |
| | | Activated clay 2 | 3 | | | | | | | |
| | | Phosphorus-based antioxidant 1 | | 3 | 3 | | | | | |
| | | Phosphorus-based antioxidant 2 | | | | 3 | | | | |
| | | Hydrotalcite | | | | | 3 | 2 | | |
| Evaluation | Two-layered extruded article | Extrudability test | A | A | A | A | A | A | A | A |
| | Multilayered heat-recoverable article | PVC wire deterioration test | A | A | A | A | A | A | A | B |
| | | Waterproofness test | A | A | A | A | A | A | A | A |
| | Adhesive layer (Adhesive composition) | Shear viscosity 1 | 1210 | 1070 | 320 | 1020 | 1180 | 1150 | 1050 | 540 |
| | | Shear viscosity 2 | 150 | 140 | 140 | 140 | 160 | 160 | 160 | 150 |
| | | Storage elastic modulus | 0.017 | 0.015 | 0.009 | 0.015 | 0.017 | 0.017 | 0.014 | 0.012 |
| | | Element detection | Si, Al | Si, Al, P | Si, Al, P | Si, Al, P | Si, Al | Si, Al | Si, Al | Si, Al |

TABLE II

| | | | Comparative Example | | | | | |
|---|---|---|---|---|---|---|---|---|
| | | | 1 | 2 | 3 | 4 | 5 | 6 |
| Composition (parts by mass) | [A] Thermoplastic resin | EVA1 | 100 | 100 | 100 | 100 | 100 | |
| | | EVA2 | | | | | | |
| | | EVA3 | | | | | | |
| | | EVA4 | | | | | | 100 |
| | | Polyamide | | | | | | |
| | [B] Organically treated layered silicate | Organically treated layered silicate 1 | | 3 | 1 | 15 | 20 | 3 |
| | | Organically treated layered silicate 2 | | | | | | |
| | [D] Viscosity characteristics modifier | Layered silicate | | | | | | |
| | | Calcium carbonate | | | | | | |
| | | Talc | | | | | | |
| | | Zeolite | | | | | | |
| | [C] Deterioration inhibitor | Activated clay 1 | | | 4 | 50 | 20 | 3 |
| | | Activated clay 2 | | | | | | |
| | | Phosphorus-based antioxidant 1 | | | | | | |
| | | Phosphorus-based antioxidant 2 | | | | | | |
| | | Hydrotalcite | | | | | | |
| Evaluation | Two-layered extruded article | Extrudability test | C | A | C | A | A | A |
| | Multilayered heat-recoverable article | PVC wire deterioration test | A | C | A | A | C | A |
| | | Waterproofness test | — | A | — | C | C | C |
| | Adhesive layer (Adhesive composition) | Shear viscosity 1 | 180 | 2350 | 240 | 4060 | 6640 | 2300 |
| | | Shear viscosity 2 | 150 | 150 | 160 | 220 | 250 | 1850 |
| | | Storage elastic Modulus | 0.004 | 0.019 | 0.01 | 0.034 | 0.105 | 0.015 |
| | | Element detection | — | Si, Al | Si, Al | Si, Al | Si, Al | Si, Al |

| | | | Comparative Example | | | |
|---|---|---|---|---|---|---|
| | | | 7 | 8 | 9 | 10 |
| Composition (parts by mass) | [A] Thermoplastic resin | EVA1 | 100 | 100 | 100 | 100 |
| | | EVA2 | | | | |
| | | EVA3 | | | | |
| | | EVA4 | | | | |
| | | Polyamide | | | | |
| | [B] Organically treated layered silicate | Organically treated layered silicate 1 | | | | 3 |
| | | Organically treated layered silicate 2 | | | | |
| | [D] Viscosity characteristics modifier | Layered silicate | 3 | | | |
| | | Calcium carbonate | | 3 | | |
| | | Talc | | | 3 | |
| | | Zeolite | | | | 3 |

TABLE II-continued

| | | [C]<br>Deterioration inhibitor | Activated clay 1<br>Activated clay 2<br>Phosphorus-based<br>antioxidant 1<br>Phosphorus-based<br>antioxidant 2<br>Hydrotalcite | | | | |
|---|---|---|---|---|---|---|---|
| Evaluation | Two-layered<br>extruded article | | Extrudability test | C | C | C | A |
| | Multilayered<br>heat-recoverable article | | PVC wire deterioration test<br>Waterproofness test | A<br>— | A<br>— | A<br>— | C<br>A |
| | Adhesive layer<br>(Adhesive composition) | | Shear viscosity 1<br>Shear viscosity 2<br>Storage elastic Modulus<br>Element detection | 190<br>150<br>0.005<br>Si, Al | 180<br>160<br>0.004<br>Si, Al | 180<br>150<br>0.004<br>Si | 1120<br>160<br>0.012<br>Si, Al |

| | | |
|---|---|---|
| [A] | EVA1 | Ethylene-vinyl acetate copolymer 1, MFR 150 g/10 min, vinyl acetate content 28% by mass |
| | EVA2 | Ethylene-vinyl acetate copolymer 2, MFR 800 g/10 min, vinyl acetate content 28% by mass |
| | EVA3 | Ethylene-vinyl acetate copolymer 3, MFR 150 g/10 min, vinyl acetate content 19% by mass |
| | EVA4 | Ethylene-vinyl acetate copolymer 4, MFR 2 g/10 min, vinyl acetate content 5% by mass ("Evatate" D2010F): manufactured by Sumitomo Chemical Co., Ltd. |
| | Polyamide | Including a dimer acid as a dicarboxylic acid (MFR 150 g/10 min) |
| [B] | Organically treated layered silicate 1 | Layered silicate treated with dimethyl distearyl ammonium chloride |
| | Organically treated layered silicate 2 | Layered silicate treated with benzyl dimethyl stearyl ammonium chloride |
| [D] | Layered silicate | "Osmos N" (specific surface 9 $m^2/g$): manufactured by Shiraishi Kogyo Kaisha, Ltd. |
| | Calcium carbonate | "Hakuenka CCR": manufactured by Shiraishi Kogyo Kaisha, Ltd. |
| | Talc | "MICRO ACE SG95": manufactured by Nippon Talc Co., Ltd. |
| | Zeolite | "MIZUKASIEVES 5AP" (average particle size 5 μm, pH11): manufactured by Mizusawa Industrial Chemicals, Ltd. |
| [C] | Activated clay 1 | "GALLEON EARTH V2" (average particle size 25 μm, pH3.3): manufactured by Mizusawa Industrial Chemicals, Ltd. |
| | Activated clay 2 | "MIZUKA ACE" (#20, Ph5.6): manufactured by Mizusawa Industrial Chemicals, Ltd. |
| | Phosphorus-based antioxidant 1 | "JP502" (ethyl acid phosphate, acid value >100 mgKOH/g): manufactured by Johoku Chemical Co., Ltd. |
| | Phosphorus-based antioxidant 2 | "JP518-O" (oleyl acid phosphate, acid value >100 mgKOH/g): manufactured by Johoku Chemical Co., Ltd. |
| | Hydrotalcite | "DHT-4A" (pH9, specific surface 10 $m^2/g$): manufactured by Kyowa Chemical Industry Co., Ltd. |

In the multilayered heat-recoverable articles of Examples 1 to 15, the extrudability of the adhesive composition used for the adhesive layer is excellent (evaluation A), and also the results of the PVC wire deterioration test and the waterproofness test are good (evaluation A).

In the multilayered heat-recoverable article of Example 16, the extrudability of the adhesive composition used for the adhesive layer is excellent (evaluation A), and also the result of the waterproofness test is good (evaluation A). Although the multilayered heat-recoverable article of Example 16 has a PVC wire deterioration test result inferior to that of the multilayered heat-recoverable articles of Examples 1 to 15 (evaluation B), it is sufficient for practical use.

In each of the multilayered heat-recoverable articles of Examples 1 to 16, the shear viscosity of the adhesive composition used for the adhesive layer is 300 Pa·s or more at a shear rate of 0.1 $s^{-1}$ and 200 Pa·s or less at a shear rate of 100 $s^{-1}$. Such viscosity characteristics are believed to contribute to improvement of extrudability of the adhesive composition used for the adhesive layer and improvement of embeddability (waterproofness) sufficient for practical use and of deterioration resistance Furthermore, in the multilayered heat-recoverable articles of Examples 1 to 16, the adhesive composition used for the adhesive layer includes 1to 15by mass of an organically treated layered silicate relative to 100 parts by mass of the thermoplastic resin. This is also believed to contribute to improvement of extrudability of the adhesive composition used for the adhesive layer and improvement of embeddability (waterproofness).

Regarding the multilayered heat-recoverable articles of Examples 1 to 16, in the element detection, Si and Al are detected in all of the adhesive compositions used for the adhesive layers. It can be gathered from this that, in the multilayered heat-recoverable articles of Examples 1 to 16, the organically treated layered silicate is satisfactorily dispersed in the thermoplastic resin in the adhesive layer.

In the multilayered heat-recoverable articles of Examples 1 to 15, the content of the deterioration inhibitor in the adhesive layer (adhesive composition) is 50% to 300% by mass relative to the content of the organically treated layered silicate. It can be gathered from this that, when extrudability and waterproofness are improved by incorporating the organically treated layered silicate in the adhesive composition, in order to suppress deterioration of the PVC wire due to the organically treated layered silicate, the content of the deterioration inhibitor is preferably set at 50% to 300% by mass relative to the content of the organically treated layered silicate.

The adhesive compositions used in Comparative Examples 1 and 7 to 9 do not include an organically treated silicate. The adhesive compositions used in Comparative Examples 1 and 7 to 9 have an excessively low shear viscosity 1 at a low shear rate, and thus it is believed that the result of the extrudability test is poor (evaluation C).

The adhesive compositions used for the adhesive layers in Comparative Examples 2 and 10 include an organically treated silicate, and therefore, the extrudability is good (evaluation A). However, because of no presence of a deterioration inhibitor or some other reason, the PVC wire deterioration test has the result in which cracks occur to such an extent that the conductor wire is visible (evaluation C).

In Comparative Example 3, the adhesive composition used for the adhesive layer includes an organically treated silicate and a deterioration inhibitor. Even though the organically treated silicate is included, since the deterioration inhibitor is included, the result of the deterioration evaluation of the PVC wire is good (evaluation A). In contrast, because of a low content of the organically treated silicate or some other reasons, the shear viscosity 1 of the adhesive layer (adhesive composition) at a low shear rate is excessively low, and thus the evaluation result of the extrudability test is poor (evaluation C).

In Comparative Examples 4 to 6, although the adhesive composition used for the adhesive layer includes an organically treated silicate and a deterioration inhibitor, because of wrong compositional ratios of the organically treated silicate and the deterioration inhibitor or some other reasons, the shear viscosity 2 of the adhesive layer (adhesive composition) at a high shear rate is excessively high, and thus the result of the waterproofness test is poor (evaluation C).

REFERENCE SIGNS LIST 1, 1A multilayered heat-recoverable article
10, 10A base material layer
11, 11A adhesive layer
2 wire splice
20 wire
21 conductor wire
3 wire harness
30 wire

The invention claimed is:

1. A multilayered heat-recoverable article comprising a base material layer and an adhesive layer disposed on an inner side of the base material layer,
characterized in that the adhesive layer includes [A] a thermoplastic resin having a melt flow rate of 15 g/10 min to 1,000 g/10 min at 190° C. and a load of 2.16 kg, [B] an organically treated layered silicate, and [C] a deterioration inhibitor;
the shear viscosity at 150° C. of the adhesive layer is 300 Pa·s or more at a shear rate of 0.1 s$^{-1}$ and 200 Pa·s or less at a shear rate of 100 s$^{-1}$; and
the deterioration inhibitor [C] is at least one selected from the group consisting of activated clay and hydrotalcite.

2. The multilayered heat-recoverable article according to claim 1, wherein the content of the deterioration inhibitor [C] is 25% to 300% by mass relative to the organically treated layered silicate [B].

3. The multilayered heat-recoverable article according to claim 1, wherein the content of the organically treated layered silicate [B] is 1 to 15 parts by mass relative to 100 parts by mass of the thermoplastic resin [A].

4. The multilayered heat-recoverable article according to claim 1, wherein the storage elastic modulus at 110° C. of the adhesive layer is 0.1 MPa or less.

5. The multilayered heat-recoverable article according to claim 1, wherein, in the case where the multilayered heat-recoverable article is used to cover an insulated wire which includes a conductor and a polyvinyl chloride layer provided on the outer periphery thereof, cracks do not occur in the polyvinyl chloride layer under heating conditions at 150° C. and for 200 hours.

6. The multilayered heat-recoverable article according to claim 1, wherein the thermoplastic resin [A] is at least one of an ethylene-vinyl acetate copolymer and a polyamide.

7. The multilayered heat-recoverable article according to claim 1, wherein the base material layer includes at least one selected from the group consisting of a polyethylene, a polyester, a polyamide, and a fluororesin.

8. A wire splice comprising:
a plurality of wires, each including a conductor and an insulating layer provided on the outside thereof; and
the multilayered heat-recoverable article according to claim 1 made to adhere to a joint in which the conductors of the plurality of wires are connected to each other.

9. The wire splice according to claim 8, wherein the insulating layer includes, as a main component, polyvinyl chloride.

10. A wire harness comprising:
a plurality of wires, each including a conductor and an insulating layer provided on the outside thereof; and
the multilayered heat-recoverable article according to claim 1 made to adhere to the plurality of wires.

11. The wire harness according to claim 10, wherein the insulating layer includes, as a main component, polyvinyl chloride.

* * * * *